US012766421B2

(12) United States Patent
Sipolins et al.

(10) Patent No.: US 12,766,421 B2
(45) Date of Patent: Oct. 20, 2026

(54) ITEM GENERATION BASED ON PLAYER DATA

(71) Applicant: Adeia Guides Inc., San Jose, CA (US)

(72) Inventors: Aldis Sipolins, Somerville, MA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 274 days.

(21) Appl. No.: 18/505,593

(22) Filed: Nov. 9, 2023

(65) Prior Publication Data

US 2025/0153053 A1 May 15, 2025

(51) Int. Cl.
*A63F 13/79* (2014.01)
*A63F 13/533* (2014.01)

(52) U.S. Cl.
CPC ............ *A63F 13/79* (2014.09); *A63F 13/533* (2014.09)

(58) Field of Classification Search
CPC ......... A63F 13/79; A63F 13/533; A63F 13/69
See application file for complete search history.

(56) References Cited

U.S. PATENT DOCUMENTS 8,231,473 B2 7/2012 Mooney et al.
2012/0220373 A1* 8/2012 Cantor .................. A63F 13/533 463/40
2014/0364210 A1* 12/2014 Murray ............... G07F 17/3272 463/31

OTHER PUBLICATIONS

Liu, Y. "What does it mean when players complaining about low drop rate"? Game Developer. https://www.gamedeveloper.com/blogs/what-does-it-mean-when-players-complaining-about-low-drop-rate- (Jul. 5, 2022).
Zendle et al. "The prevalence of loot boxes in mobile and desktop games," Center for Open Science. http://dx.doi.org/10.31234/osf.io/mkhp2 (2019).
Zendle et al., "The changing face of desktop video game monetisation: An exploration of trends in loot boxes, pay to win, and cosmetic microtransactions in the most-played Steam games of 2010-2019," Center for Open Science. http://dx.doi.org/10.31234/osf.io/u35kt (2019).

* cited by examiner

*Primary Examiner* — Thomas H Henry
(74) *Attorney, Agent, or Firm* — HG LAW LLP

(57) ABSTRACT

Systems and methods are described for providing an in-game item to a player. An instruction is received to generate an in-game item for a first player. A second player is identified based on a first metric. A second metric is generated based on at least data associated with the second player. The in-game item is generated based on the second metric and the in-game item is provided to the first player.

20 Claims, 11 Drawing Sheets

ITEM GENERATION BASED ON PLAYER DATA

BACKGROUND

The present disclosure relates to methods for providing an in-game item to a player. Particularly, but not exclusively, the present disclosure relates to improving user experience and engagement with a game by providing an in-game item to a player which is of interest to another player to encourage interaction between players.

SUMMARY

Video games of many genres generate in-game items, ranging from car decals in racing games to enchanted weapons in action games. Any given game will have a massive library of potential in-game items to generate, and each game sets its own probabilities for unlocking different items (also called 'drop rates'). Depending on the game, drop rates can be static or dynamic, changing based on player actions or game context. To generates an in-game item, a game will typically generate a random number used to identify an item according to the game's drop rates. Items provided in this manner are likely to be the most common outcome. However players usually desire a particular category of item (or even a specific item) and therefore the provided item is likely to be useless to the player. This can result in disappointing experience for a player, which can negatively impact engagement.

It is therefore a first non-exclusive object of this disclosure to provide a method which solves the above problem.

According to a first aspect, there is provided a method comprising: receiving an instruction to generate an in-game item for a first player, identifying a second player based on a first metric, generating a second metric based on at least data associated with the second player, generating the in-game item based on the second metric, and providing the in-game item to the first player. This may encourage interaction between the first player and the second player and improve user engagement because an in-game item which is of interest of the second player is provided to the first player. The first player and the second player may be associated to one another via a mechanism defined in a game (such as being on a friends list, teammate, co-op players, etc).

In one example, the first metric may comprise a likelihood of engagement parameter associated with the second player. The likelihood of engagement parameter may be determined based on data associated with the first and/or the second player. Every player in a game associated with the first player may have a likelihood of engagement parameter associated thereto. This may facilitate selection of a player amongst one or players associated with the first player in such a manner that the likelihood of engagement between the first player and the second player is maximised.

In one example, the second metric may comprise a user-specific item desirability score (USIDS). The USIDS may be generated based on data associated with the second player with respect to one or more items. The one or more items may be available items for providing to the first player amongst a set of in-game items. The advantage of using the USIDS may be that it ensures the generated item would be an item desired by the second player (i.e., the target player) thus maximising the likelihood of user engagement.

In one example, the method may further comprise: determining that the user-specific item desirability score is above a threshold, and providing an output to the first player when the user-specific item desirability score associated with the second player is above the threshold. This allows informing the first player that the provided in-game item is desired by a player associated with the first player.

In one example, the output may indicate the second player to the first player. The output may have a user interface element such as a sound and/or visual element. The output may comprise a haptics element. The sound, visual element, and/or the haptics element may be recognised by the first player as being associated with the second player.

In one example, the output may comprise a user interface element facilitating exchange of items between the first player and the second player. The user interface element may compromise a form of interactive element which upon receiving an input from the first player initiates an item exchange process between the first player and the second player.

In one example, the first metric and/or the second metric comprise one or more parameters associated with game configuration. The one or more game parameters may be configured by a third party (such as a game developer).

In one example, the first metric may comprise at least one of total game playtime, total playtime spent with the first player, time since last played, character information and play history, proportion of playtime spent in single-player versus multiplayer, and number of peer-to-peer transactions made.

In one example, the first metric may comprise at least one of total playtime across all games spent with the first player, number of games previously played with the first player, proportion of time spent with single-player versus multiplayer games, number and/or type of game titles owned, number of peer-to-peer transactions made across all games.

In one example, the identifying a second player based on a first metric may comprise: retrieving data associated with one or more players different from the first player, generating a likelihood of engagement parameter for each one of the one or more players based on the data associated with one or more players, wherein the first metric comprises the likelihood of engagement of each one of the one or more players.

In one example, the method may comprise: ranking the one or more players based on the generated likelihood of engagement associated with each one of the one or more players.

In one example, the method may comprise: generating a third metric based on at least data associated with the first player, identifying a second in-game item based on the third metric, providing a media content including information associated with the second in-game item to the first player.

In one example, the third metric is generated based on data including total playtime across one or all games spent with the first player, number of games previously played by the first player, proportion of time spent with single-player versus multiplayer games, number and/or type of game titles owned, number of peer-to-peer transactions made across one or all games.

DETAILED DESCRIPTION

Systems that randomly identify items for loot drops may result in disappointing player experience. To illustrate, in one approach, a loot box can be obtained by a player. The player may obtain the loot box by way of a purchase, as a reward for finishing a particular mission or task or finding the loot box in the game. Upon opening the loot box by the player, the game randomly identifies and generates items according to the game's drop rates. The player is subsequently provided with the generated items. However, because the generated items are random items, the items may be useless to the player. This negatively impacts user experience and user engagement.

Figure 1:
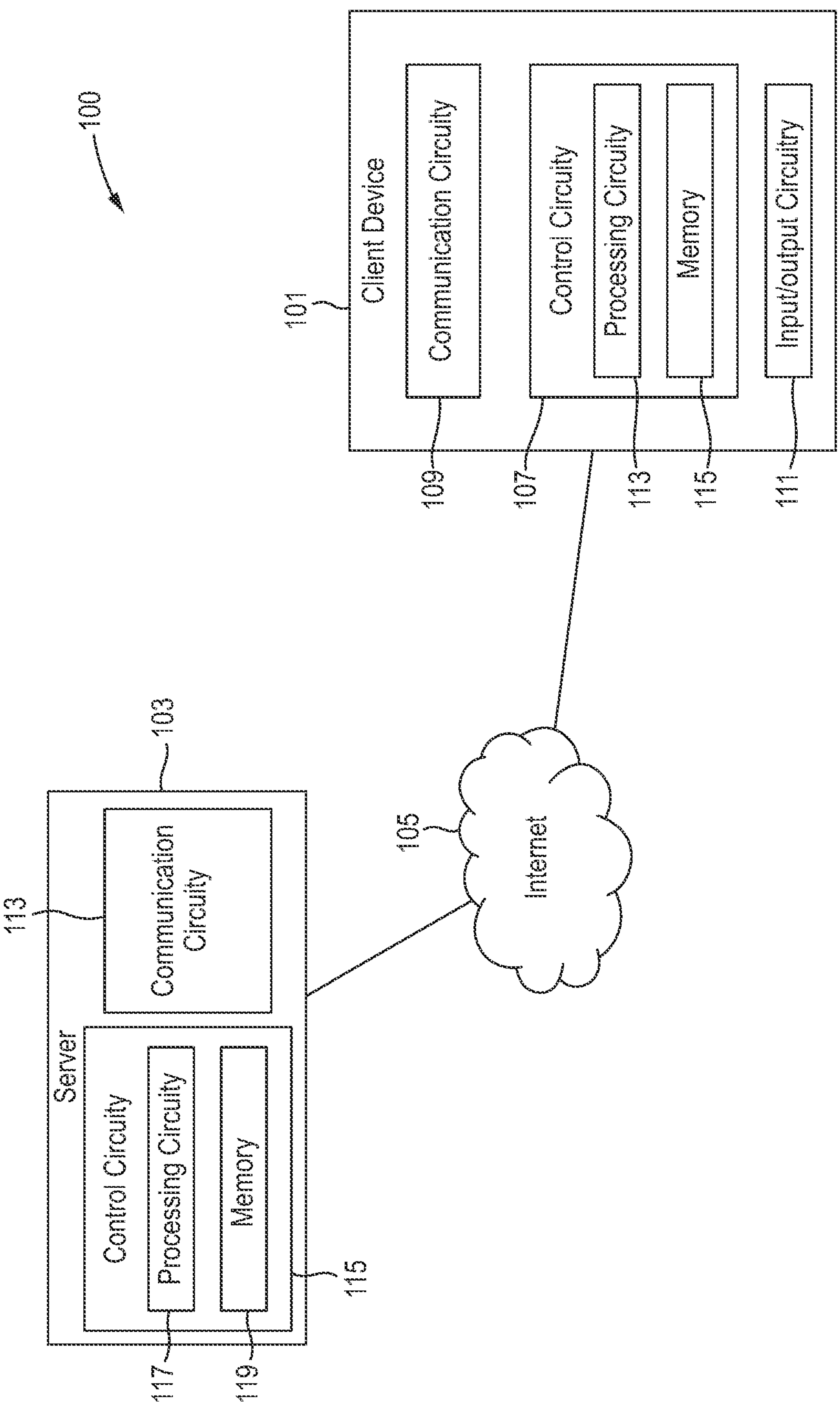
FIG. 1 illustrates a block diagram of a system according to one or more embodiments.

FIG. 1 illustrate a block diagram of a system 100 according to one or more embodiments. The system 100 comprises a client device 101 and a server 103. The client device 101 may be connected to the server 103 via internet 105. However, it should be appreciated that this is an exemplary embodiment and in other embodiments the client device 101 and the server 103 may be connected to one another locally such as by means of a cable or a wireless connection. The client device 101 may comprise a control circuitry 107, a communication circuitry 109 and an input/output circuitry 111. The control circuitry 107 may comprise a processing circuitry 113 and a memory 115. The communication circuitry 109 may be used to communicate with the server 103. The input/output circuitry 111 may be used to provide output content such as a user interface to a user and receive input data from the user. The server 103 may comprise a communication circuitry 113, a control circuitry 115. The communication circuitry 113 may be used to communicate with the client device 101. The control circuitry 115 may comprise a processing circuitry 117 and a memory 119.

Figure 2:
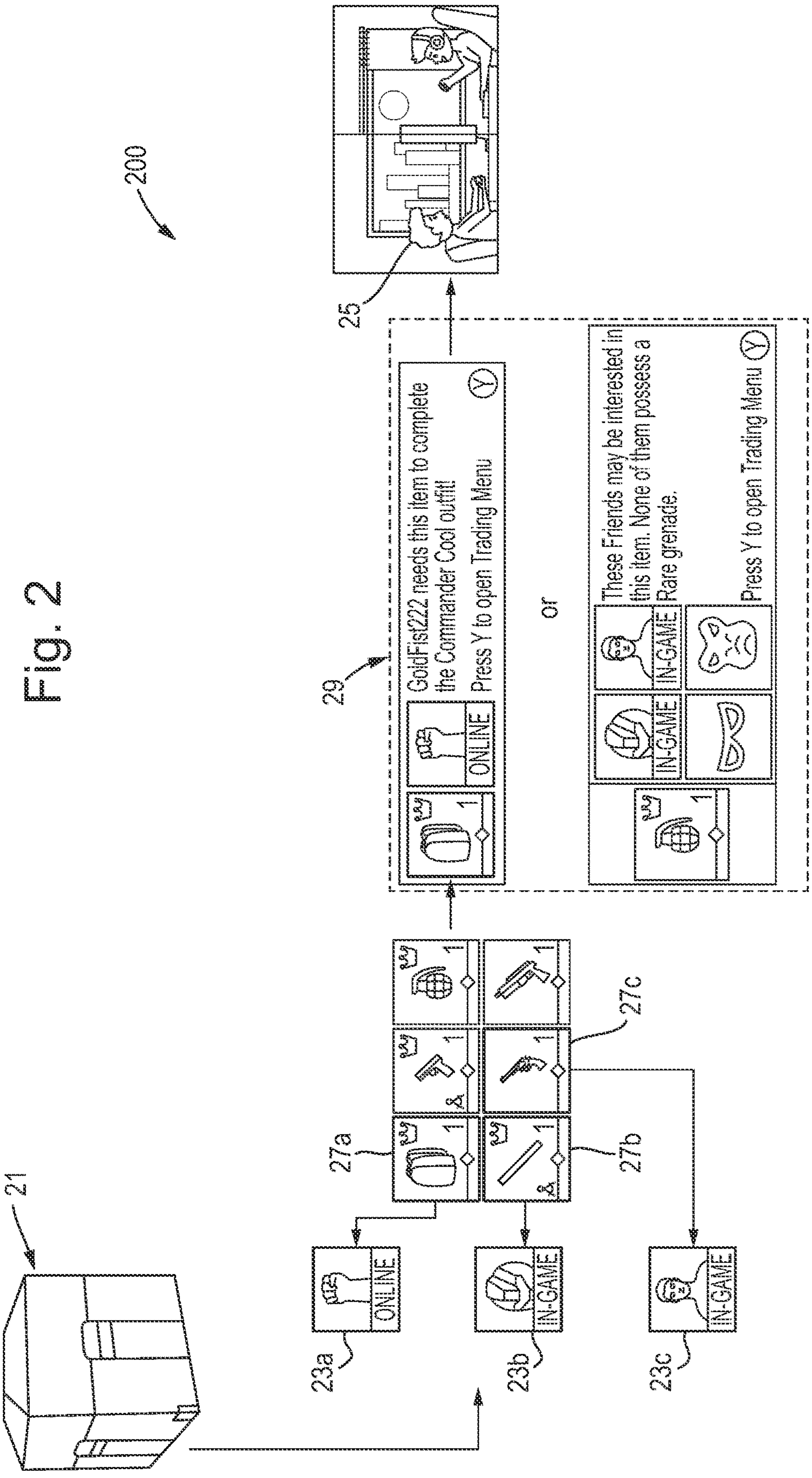
FIG. 2 illustrates a diagram for providing an item to a first player according to one or more embodiments.

FIG. 2 illustrates a diagram depicting a system 200 for providing an item to a first player according to one or more embodiments. In the depicted example, a first player 25 of a video game obtains a loot box 21. It should be appreciated that the loot box 21 is an example and in other embodiments the first player 25 may obtain or interact with any other form of in-game object designed to provide the first player 25 fully or semi-randomised items, for example a chest, a virtual vending machine, virtual content packs, etc. It should also be appreciated that the term "first player" may refer to any user of a video game who obtains and/or opens a loot box or similar in-game objects. The first player 25 may obtain the loot box 21 through a purchase made using real currency or using in-game virtual currency or obtain as a reward for finishing a particular mission or task or by random or designed discovery of the loot box in the game.

Upon opening the loot box 21 by the first player 25, one or more players (such as players 23*a*, 23*b* and 23*c*) associated with the first player 25 are identified. The players 23*a*, 23*b* and 23*c* may be associated with the first player 25 because they have accepted a friend request from the first player 25 (or vice versa). However, in other embodiments, the association between the players 23*a*, 23*b* and 23*c* and the first player 25 may be due to being teammates, co-op players, opponents etc. In one embodiment, the players 23*a*, 23*b* and 23*c* may be players who play the same game as the first player 25 most actively.

The first player 25 receives a combination of random items and items personalised to the identified players 23*a*, 23*b* and 23*c*. For example, an in-game item 27*a* may be a particular backpack personalised to the player 23*a* because the player 23*a* has collected every item for a player outfit except this matching backpack. As another example, an in-game item 27*b* may be a rocket launcher personalised to the player 23*b* because the player 23*b* does not own a rocket launcher and has already completed several peer-to-peer transactions. As another example, an in-game item 27*c* may be a pistol personalised to the player 23*c* because the player 23*c* tends to use pistols and has not acquired this one.

It should be appreciated that the number of identified players in this embodiment are exemplary and are intended to be non-limiting. In other embodiments only one player (for examples only player 23*a*) or two players or more than three players may be identified. It should also be appreciated that the first user may receive only one item personalised to another player (a second player) or any other number of combinations of personalised items and random items.

Optionally, the first player may receive at least one output 29 (such as a notification) for the personalised and non-personalised items based on one or more conditions. The condition may be that that one of the provided items has a User-Specific Item Desirability Score (USIDS) above a threshold. The USIDS may be a metric based on available player data that predicts how useful an in-game item would be to a player. Additionally, the output 29 may include a user interface element to transfer, gift or exchange at least one of the provided items with a second player.

Figure 3:
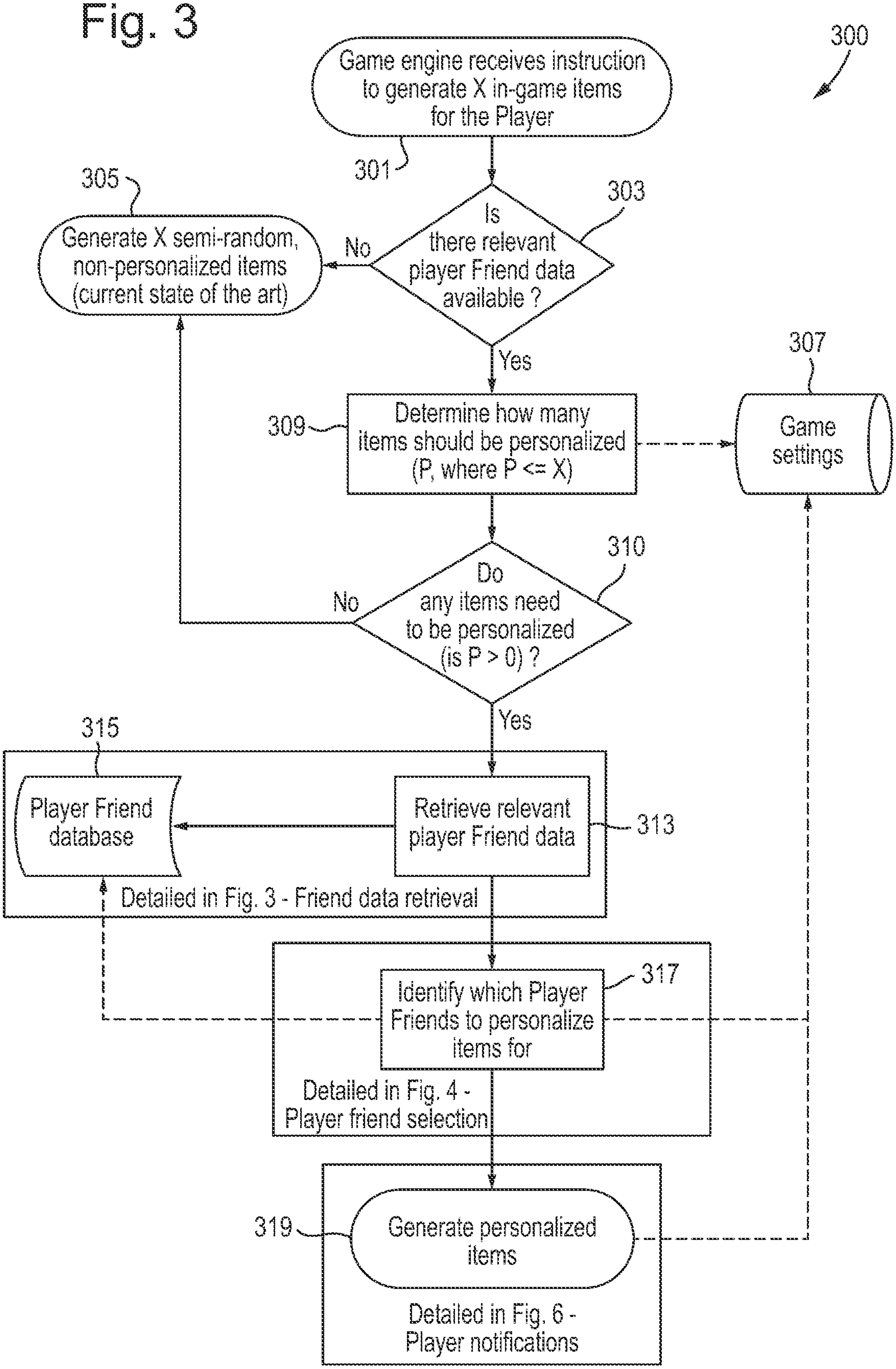
FIG. 3 illustrates a method according to one or more embodiments.

FIG. 3 illustrates a method according to one or more embodiments. The method 300 may be implemented, in whole or in part, by the system 100 shown in FIG. 1. One or more actions of the method 300 may be incorporated into or combined with one or more actions of any other process or embodiments described herein. The method 300 may be saved to a memory or storage (such as any one or more of those shown in FIG. 1) as one or more instructions or routines that may be executed by a corresponding device or system to implement the method 300.

At step 301, a game engine, which may be a software framework stored and processed by the control circuitry 107 and/or the control circuitry 115 of FIG. 2, receives instruction to generate at least one in-game item for a first player. For example, X number of in-game items may need to be generated, where X can be any number such as one and more than one. At step 303, the game engine may determine whether there is relevant game-specific or platform-specific information available. The data may be data relevant and/or associated to a second player (e.g., game playtime, time since last played, number of peer-to-peer transactions). If such data is not available, the game engine may proceed to step 305 and generate at least one semi-random, non-personalised item (i.e., X in-game items) for providing to the first player. However, if the game engine determines that such data is available, the game engine proceeds to step 309.

At step 309, the game engine may determine how many items should be personalised (for example P number of items, where P≤X).

It should be appreciated that if only one item is to be generated then the game engine may skip step 309.

At step 307, the game engine may consult and use information provided in game settings (i.e., game configuration) to determine how many items should be personalised in step 309.

At step 310, the game engine may determine whether any in-game item require personalisation. In other words, the game engine determines whether P>0. If it is determined that no item requires personalisation (i.e., P=0) then the game engine may revert to step 305. If it is determined that an in-game item requires personalization (i.e., P>0) then the game engine proceeds to step 313.

At step 313, the game engine may retrieve the relevant data for the second player. At step 315, the game engine may consult a player database to retrieve the relevant data for the second player. Steps 313 and 315 will be described in more detail in FIG. 4.

At step 317, the game engine may identify for which player the at least one in-game item should be personalised for based on a first metric. The game engine may consult game settings and/or player database to identify the player. Step 317 will be described in more detail in FIG. 5.

At step 319, the game engine may generate the at least one in-game item based on a second metric. The second metric may comprise the data retrieved at step 313. The game engine may optionally consult game settings to generate the at least one in-game item. Step 319 will be described in more detail in FIG. 7.

Figure 4:
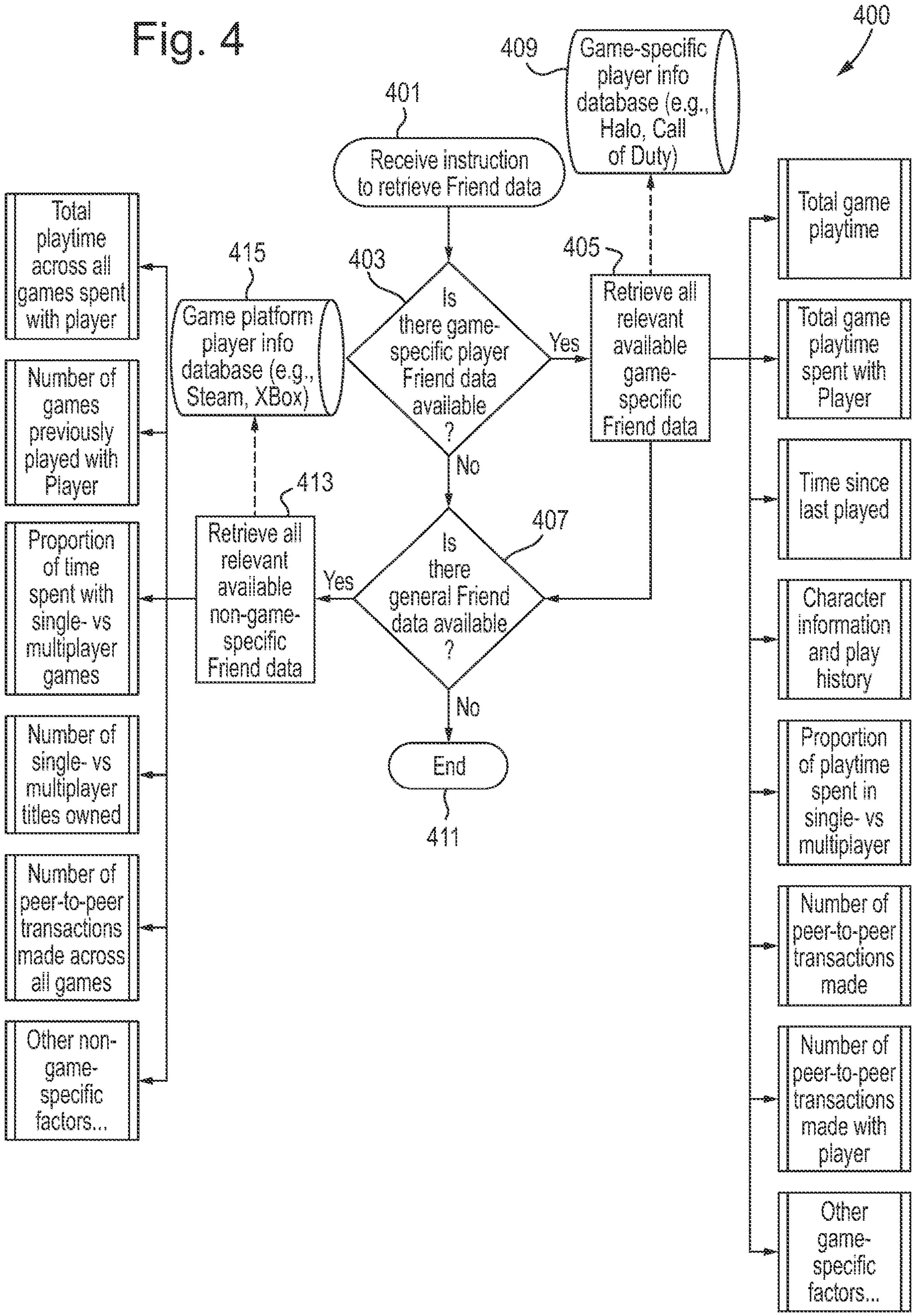
FIG. 4 illustrates a method of retrieving data associated with one or more players.

FIG. 4 illustrates a method 400 of retrieving data associated with one or more players different from the first player. The method 400 may be implemented, in whole or in part, by the system 100 shown in FIG. 1. One or more actions of the method 400 may be incorporated into or combined with one or more actions of any other process or embodiments described herein. The method 400 may be saved to a memory or storage (such as any one or more of those shown in FIG. 1) as one or more instructions or routines that may be executed by a corresponding device or system to implement the method 400. The game engine may perform the method 400 described in FIG. 4 at steps 313 and 315 of the embodiment described in FIG. 3.

At step 401, the game engine receives instructions to retrieve data associated with one or more players different from the first player. The data may be game-specific friend data of the first player. At step 403, the game engine determines whether there is game-specific player data available. If game-specific player data is available then, the game engine proceeds to step 405. At step 405, the game engine retrieves all relevant available game-specific data. The retrieved game-specific data may include at least one of total game playtime, total playtime spent with the first player, time since last played, character information and play history, proportion of playtime spent in single-player versus multiplayer, number of peer-to-peer transactions made. Optionally, at step 409 the game engine may consult other game-specific player information database. Subsequently, the game engine may proceed to step 407.

If at step 403, the game engine determines that there is no game-specific player data available, then the game engine may proceed directly to step 407.

At step 407, the game engine may determine whether there is general player data available. The data may be any friend data of the first player.

If the game engine determines that there is no non-game-specific player data available, then the game engine may proceed to step 411.

If it is determined that general player data is available, the game engine may then proceed to step 413. At step 413, all relevant available non-game-specific player data is retrieved. The retrieved non-game-specific data may include at least one of total playtime across all games spent with the first player, number of games previously played with the first player, proportion of time spent with single-player versus multiplayer games, number and/or type of game titles owned, number of peer-to-peer transactions made across all games. Optionally, at step 415 the game engine may consult other game and/or platform-specific player information databases.

Figure 5:
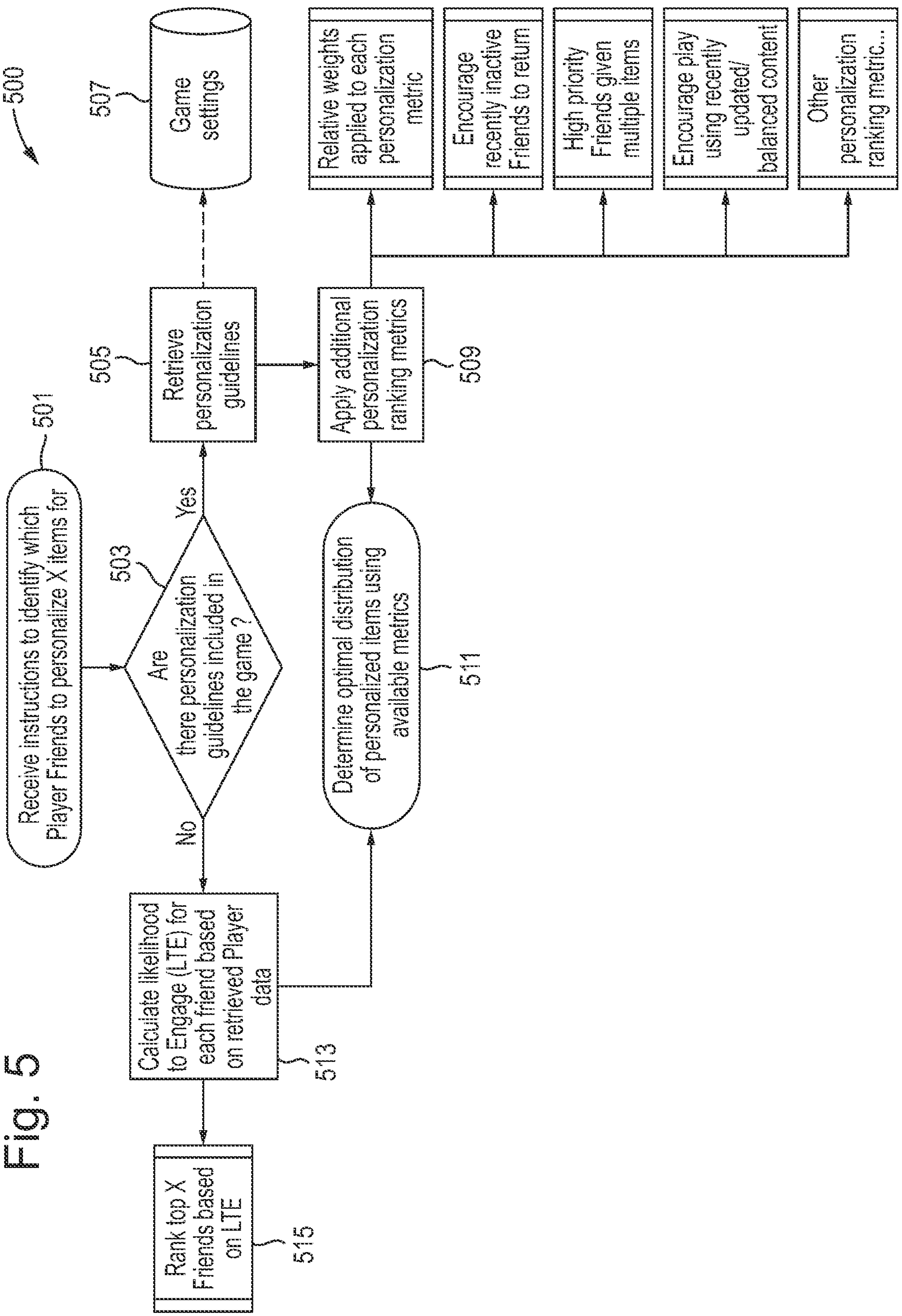
FIG. 5 illustrates a method of identifying a second player based on a first metric.

FIG. 5 illustrates a method 500 of identifying a second player based on a first metric. The method 500 may be implemented, in whole or in part, by the system 100 shown in FIG. 1. One or more actions of the method 500 may be incorporated into or combined with one or more actions of any other process or embodiments described herein. The method 500 may be saved to a memory or storage (such as any one or more of those shown in FIG. 1) as one or more instructions or routines that may be executed by a corresponding device or system to implement the method 500. The game engine may perform the method 500 described in FIG. 5 at step 317 of the embodiment described in FIG. 3.

At step 501, the game engine receives instruction to identify at least one player for which an in-game item should be personalised.

At step 503, the game engine determines whether personalisation guidelines exist. An example of personalisation guidelines may be that when a second player has recently stopped playing the game, the personalisation guidelines may indicate that an item should be personalised for that player to draw them back into the game. Another example of personalisation guidelines may be that if a second player has recently started playing a new in-game character (e.g., a mage in a fantasy game), personalization guidelines may indicate that an item should be personalised for that player's new character (rather than the second player's most played character). Yet in another example of personalisation guidelines, when a second player is currently using an in-game item that is low in quality relative to the rest of their items, personalisation guidelines may indicate that a similar item of higher quality be personalized for that player. In this example, item quality may be determined by any combination of item characteristics (e.g., level required, damage per second, attack damage and attack speed). The personalisation guidelines may specify how many in-game items to generate for each player based on priority. If personalisation guidelines exist, the game engine proceeds to step 505.

At step 505, the game engine may retrieve the personalisation guidelines. Optionally, at step 507, the personalisation guidelines may be retrieved from game settings (i.e., game configuration).

At step 509, the game engine may apply additional personalisation ranking metrics. The personalisation ranking metrics may include at least one of relative weights applied to each personalisation metric, encourage recently inactive friends of the first player to return, high priority friends given multiple items, encourage play using recently updated/balance content or other personalisation ranking metrics. The game engine may then proceed to step 511.

At step 511, the game engine determines optimal distribution of personalised items using available metrics.

If at step 503, the game engine determines that no personalisation guidelines exist, the game engine proceeds to step 513.

At step 513, the game engine calculates a Likelihood to Engage (LTE) parameter for each player based on the retrieved player data. The LTE may be a metric based on available player data that predicts how likely that player is to engage in a peer-to-peer transaction with the first player. The peer-to-peer transaction may include an in-game exchange of items, either as a gift or a trade.

At step 515, the game engine may rank players based on the LTE parameter. Optionally, the number of players ranked based on the LTE parameter may be equal to the number of items to be generated. The game engine may then proceed to step 511.

At step 511, the game engine determines optimal distribution of personalised items using available metrics.

Figure 6:
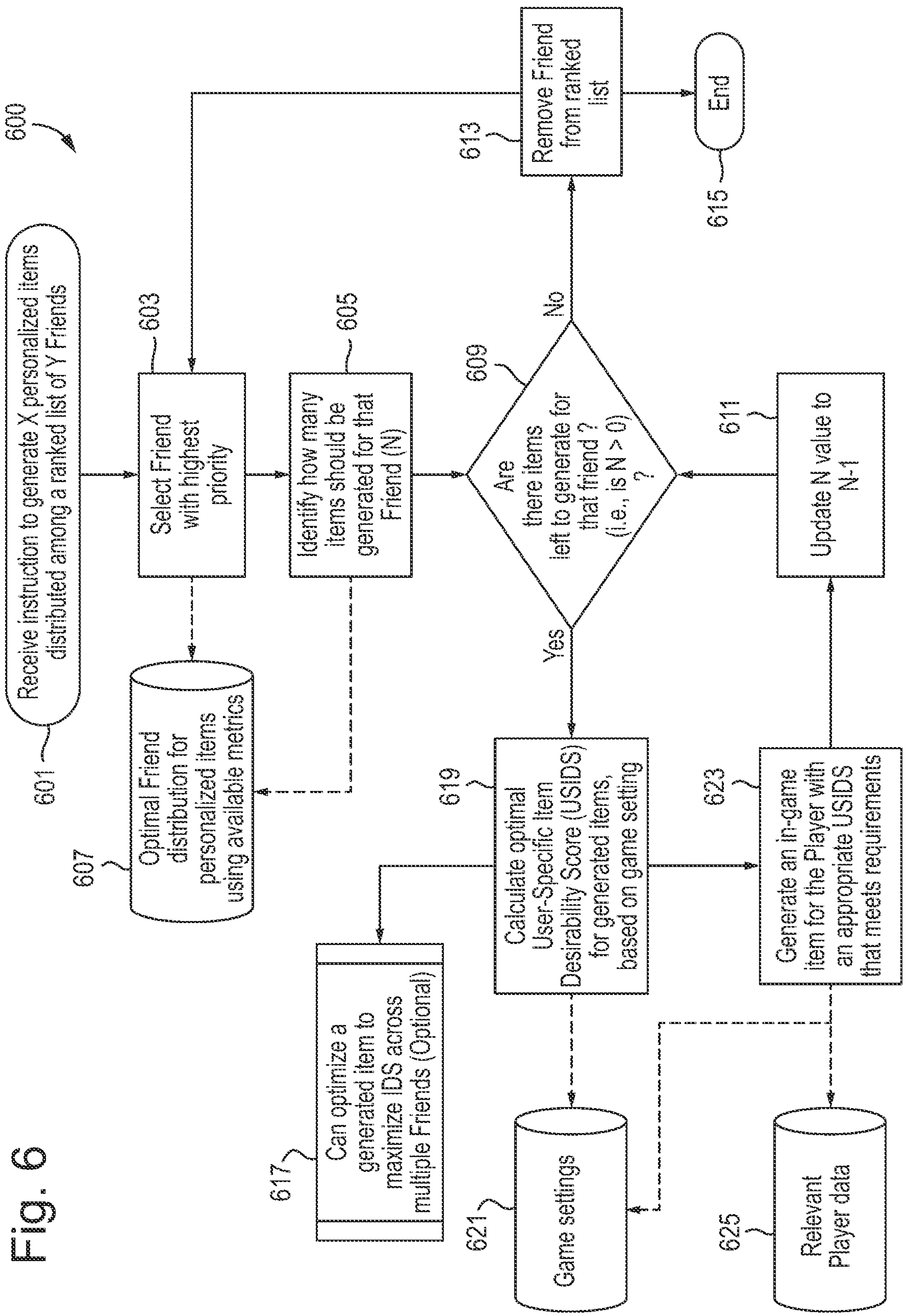
FIG. 6 illustrates a method of determining optimal distribution of personalised items using available metrics and generating an in-game item.

FIG. 6 illustrates a method 600 of determining optimal distribution of personalised items using the available metrics and generating an in-game item. The method 600 may be implemented, in whole or in part, by the system 100 shown in FIG. 1. One or more actions of the method 600 may be incorporated into or combined with one or more actions of any other process or embodiments described herein. The method 600 may be saved to a memory or storage (such as any one or more of those shown in FIG. 1) as one or more instructions or routines that may be executed by a corresponding device or system to implement the method 600.

At step 601, the game engine receives instruction to generate X quantity of in-game item distributed among a ranked list of Y number of players different from the first player based on priority. The X and Y may be equal to one or any number greater than one. At step 603, the game engine may select the player with the highest priority ranking (i.e., a second player). Optionally, at step 607, the selection of the player with the highest priority ranking may be based on the optimal player distribution for personalised items using available metrics. As one example, the game engine may generate any number of items for any number of players. Game developers may specify "This lootbox generates X items" in the game engine, and the game engine may subsequently use the LTE parameter and personalization metrics to decide which players the items are personalized for and how many items they each receive. For example, when a first player opens a lootbox that contains 5 items, the game engine may look through other players associated with the first player and identify two players with strongest associations with the first player who have recently stopped playing the game, as well as a third player who recently started playing the game. In this example, an expansion pack may have been recently released for the game with new items and characters and so it is desired to attract the former players to the game. In this case, the game engine generates two items each for the two players with strongest associations with the first player: 1 new item for their existing characters from the new expansion pack and 1 new item for the new character type. The last item might be generated for the lower priority third player who was already getting into the game.

At step 605, the game engine may identify a number of items (N) that should be generated for the second player. The identification of N may be based on the optimal player distribution for personalised items using available metrics.

At step 609, the game engine may determine whether there are items left to generate for the second player. In other words, the game engine may determine whether N is bigger than zero. If it is determined that no item is left to generate for the second player, the game engine proceeds to step 613.

At step 613, the game engine removes the second player from the ranked list and either returns to step 603 or proceeds to step 615.

However, if it is determined that there are one or more items left to generate for the second player at step 609, the game engine may proceed to step 619.

At step 619, the game engine may generate a second metric. The second metric may comprise a User-Specific Item Desirability Score (USIDS). The game engine may calculate the USI) for in-game items to be generated based on game settings. The USIDS can be defined as a metric derived at least based on available player data that predicts how useful an in-game item would be to the second player or to the first player. The available data may be the retrieved data in steps 413 and/or 405 of FIG. 4.

In some embodiments, the USIDS may relate to features such as the player's character level, playstyle, and owned items. For example, if a second player has a large collection of cosmetic items for a specific character, the game engine may increase that player's USIDS of a new cosmetic item for that character.

Optionally, at step 617, the game engine may optimise a generated item to maximise USIDS across multiple players associated with the first player.

Optionally, the game engine may consult game settings to calculate an optimal USIDS for one or more items (step 621).

At step 623, the game engine may generate an in-game item for the second player based on the second metric. The generated item may be associated with an appropriate USIDS that meets the determined requirements in steps 619. Optionally, the game engine may consult game settings and retrieve player data (step 625) to generate the in-game. The game engine may then proceed to step 611.

At step 611, the game engine may update the identified number of items N. For example, by subtracting one from the N value. The game engine may then return to step 609.

In one embodiment, after the first player receives the generated one or more in-game items, the game engine may generate an output (such as a notification) informing the first player that the second player may find at least one of the provided items useful. In some embodiments, the output may include a user interface element to enable the first player and/or the second player to more easily engage in peer-to-peer transactions (e.g., by pressing a specific button to trade an item with this the second player). In one embodiment, the game engine may generate an output for the second player, informing them that the first player has acquired a highly desired item.

Figure 7:
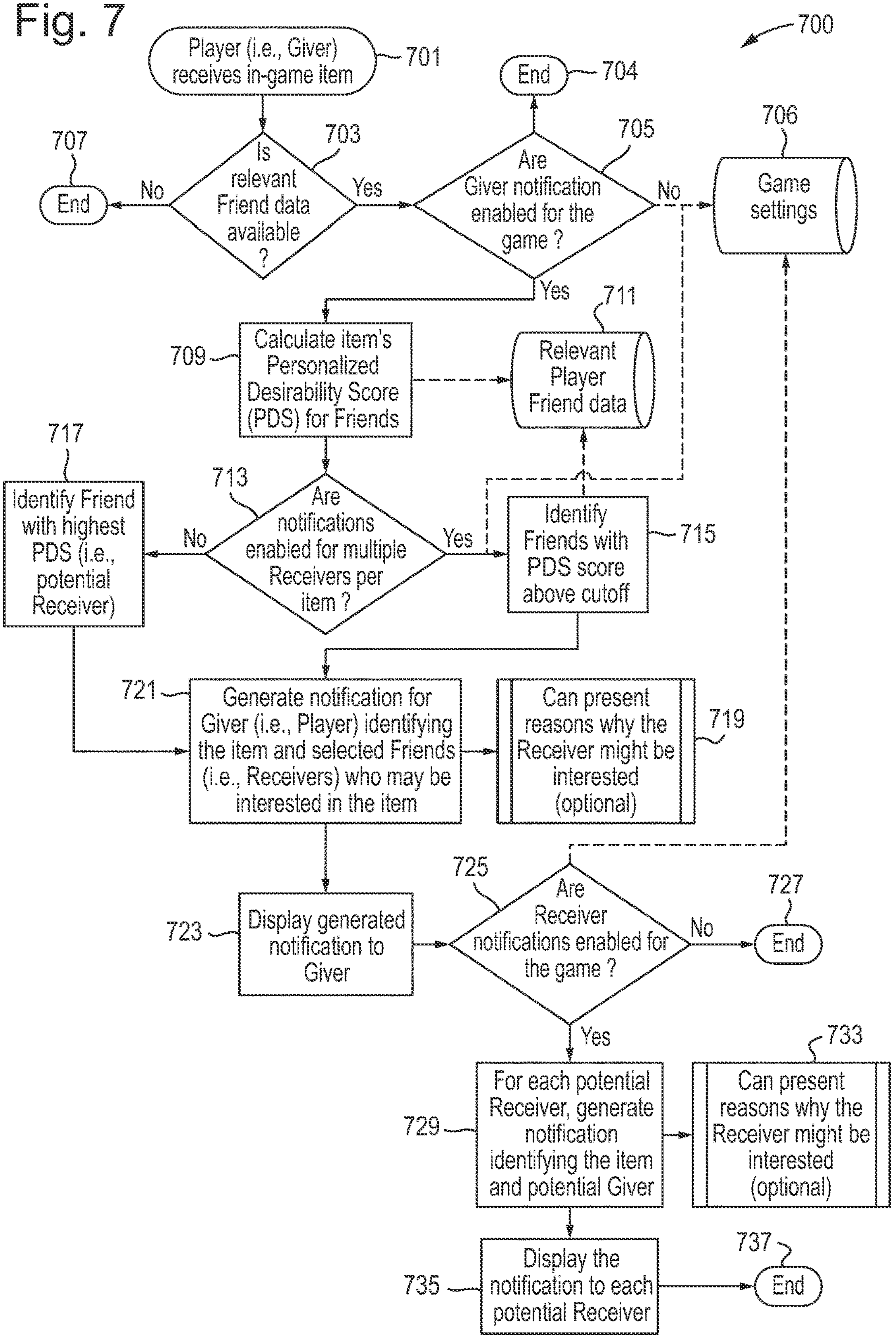
FIG. 7 illustrates a method of generating in-game notifications for randomised or personalised items.

FIG. 7 illustrates a method 700 of generating in-game notifications for randomised or personalised items. The method 700 may be implemented, in whole or in part, by the system 100 shown in FIG. 1. One or more actions of the method 700 may be incorporated into or combined with one or more actions of any other process or embodiments described herein. The method 700 may be saved to a memory or storage (such as any one or more of those shown in FIG. 1) as one or more instructions or routines that may be executed by a corresponding device or system to implement the method 700.

At step 701, the first player receives an in-game item. The in-game item may be generated based on the embodiments of FIGS. 3 to 6.

At step 703, the game engine determines whether relevant second player data is available. If it is determined that relevant second player data is not available, the game engine proceeds to end the process (step 707). However, if it is determined that relevant second player data is available, the game engine may determine whether the first player has notification enabled (step 705). Optionally, the game engine may consult game settings to determine whether notification is enabled (step 706).

If it is determined that notification is not enabled for the first player, the game engine may proceed to end the process (step 704).

If it is determined that the notifications for the first player is enabled, the game engine proceeds to step 709.

At step 709, the game engine may calculate the in-game item's Personalised Desirability Score (PDS) for one or more players associated with the first player. Optionally, the game engine may consult the relevant player data to determine PDS (step 711). The relevant player data may be the retrieved data in steps 413 and/or 405 of FIG. 4.

At step 713, the game engine may determine whether notifications are enabled for several players per each in-game item. Optionally, the game engine may consult game settings to determine whether notification is enabled for several players per each in-game item (step 706).

If it is determined that notifications are enabled for several players per item, the game engine determines one or more players who have a PDS score above a threshold (step 715). Optionally, the game engine may consult the relevant player data to determine the PDS score. The game engine may then proceed to step 721.

However, if it is determined that notifications are not enabled for several players per item, the game engine may identify one player (i.e., the second player) with the highest PDS (step 717) and then proceed to step 721.

At step 721, the game engine may generate notifications for the first player indicating the in-game item and the second player who may be interested in the in-game item. Optionally, the game engine may present a reason as to why the second player might be interested (step 719).

At step 723, the game engine may display the generated notification to the first player.

At step 725, the game engine may determine whether notifications are enabled for the second player. Optionally, the game engine may consult game settings to determine whether notification is enabled for the second player (step 706). If it is determined that the notifications are not enabled for the second player, the game engine may proceed to end the process (step 727). If it is determined that the notifications are enabled for the second player, the game engine may proceed to step 729.

At step 729, the game engine may generate a notification for each player potentially receiving an in-game item. The notification may identify at least one of the generated in-game item and the first player. Optionally, the game engine may present a reason as to why each potential player receiving an in-game item might be interested (step 733).

At step 735 the game engine may display the notification to each potential player receiving an in-game item and proceed to end the process (step 737).

The actions or descriptions of FIGS. 3 to 7 may be done in any suitable alternative orders or in parallel to further the purposes of this disclosure.

In one embodiment, the game engine may examine the second player's in-game inventory to identify in-game items with similar USIDS for the first player and generate a notification informing the first player of a potential trade. The notification may be "Friend X may be interested in the item you just found. Friend X has Item Y, which you may be interested in. Press Y to open menu for trading with Friend X."

In one embodiment, the game engine retrieves data associated with a first player and/or the second player indicating a list of specific in-game items or item classes that are desired by each respective player. In one embodiment, the data may contain a Wishlist for each player. The game engine may utilise this the data to generate in-game notifications for trades between the first player and the second player. For example, when the game engine determines that the data associated with the first player indicates an in-game item which is possessed by the second player and the data associated with the second player indicates an in-game item which is possessed by the first player, the game engine may generate an output which informs the first player and the second player of the possibility of a trade or exchange.

In one embodiment, the game engine may additionally use data associated with a distinct in-game character rather than data associated with a user account to further tailor the generated item to the second player. For example, the game engine may use character-specific features (e.g., character skills chosen, character playtime relative to other characters, time since most recent character play session) to further tailor the generated item to the second player.

In one embodiment, the game engine may utilise data indicating specific game configuration provided by a game designer or game developer to influence the item generation process. For example, the data may indication that placing greater weights on specific in-game items or item classes, in an effort to balance game difficulty or encourage certain playstyles. For example, in a game with multiple character classes, game designers may wish to encourage more players to use an unpopular character class by increasing drop rates for character-specific items.

In one embodiment, USIDS may be calculated for randomised (i.e., non-personalized) items and used to generate notifications. Notifications for other players may be suspended for items with a high USIDS for the first player who obtained the item.

In one embodiment, the game engine may seek to maximize USIDS for an item across multiple friends. For example, the generated in-game item may have an associated USIDS which is above a threshold for several players different from the first player but associated with the first player.

In one embodiment, the game engine may calculate USIDS for one or more players associated with the second player but not associated with the first player, where the second player is associated with the first player. In one embodiment, when the first player receives an in-game item with a USIDS below a threshold for the first player and players associated with the first player such as a second player, but the USIDS is above a threshold for one or more players associated with the second player but not associated with the first player, the game engine may generate an output informing the first player of a potential trade or exchange. The output may be a notification indicating "Friend Y is friends with Friend Z, who may be interested in the item you just found." The second player may receive a similar notification: "Your Friend X just found an item that your friend Z may be interested in".

In one embodiment, the game engine may analyse in-game communications to identify items of interest and update USIDS models. For example, players who engage in text or voice chat discussions about a specific in-game item may have a higher USIDS for that item.

In one embodiment, the game engine may identify sets of in-game items (e.g., outfits, weapon packs) and modify USIDS for players who already own one or more of the in-game items in a set. As one example, a player X who owns 5 of 6 items in an outfit class, their USIDS for item 6 in that outfit class would be higher than a player Y who owns 2 of 6 items, whose USIDS would be higher than Player Z who owns none.

Figure 8:
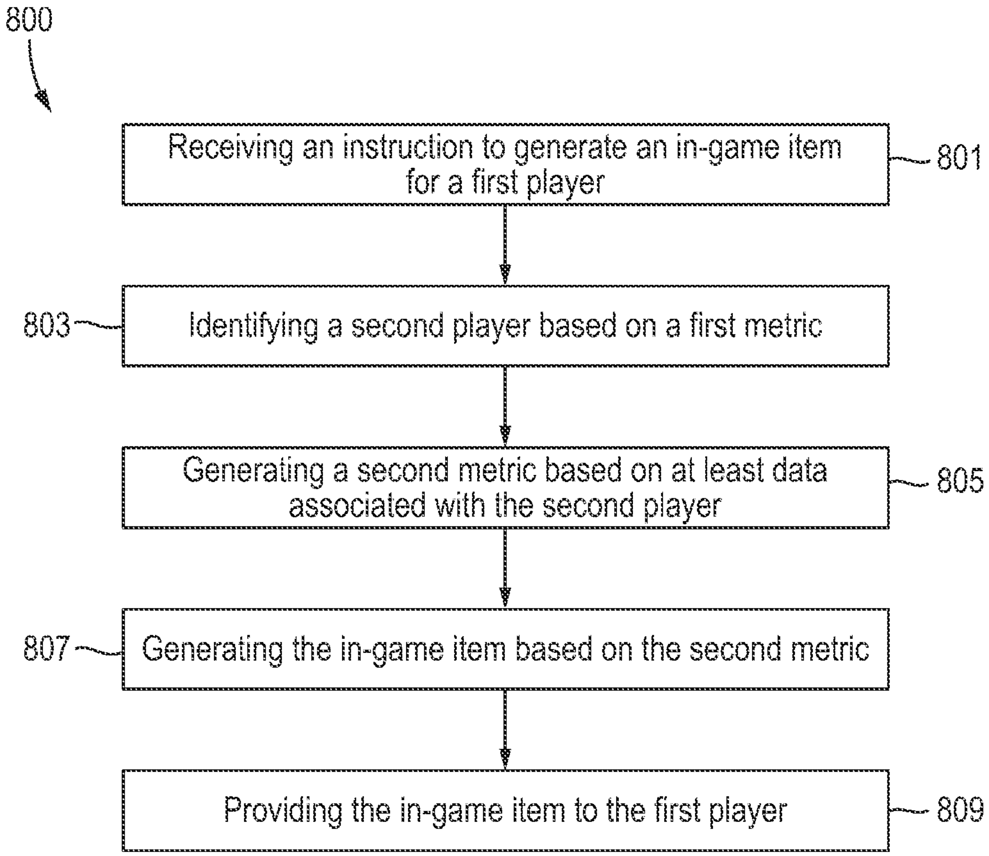
FIG. 8 illustrates a method according to one or more embodiments.

FIG. 8 illustrates a method 800 according to one or more embodiments. The method 800 may be implemented, in whole or in part, by the system 100 shown in FIG. 1. One or more actions of the method 800 may be incorporated into or combined with one or more actions of any other process or embodiments described herein. The method 800 may be saved to a memory or storage (such as any one or more of those shown in FIG. 1) as one or more instructions or routines that may be executed by a corresponding device or system to implement the method 800.

At a step 801, an instruction is received to generate an in-game item for a first player. At step 803, a second player is identified based on a first metric. At step 805. A second metric is generated based on at least data associated with the second player. At step 807, the in-game item is generated based on the second metric. At step 809, the in-game item is provided to the first player.

In another embodiment according to the present disclosure, a third metric is used to provide personalised media content to a first player. In this embodiment a media content template and a pool of potential in-game items may be available. When a system such as the system 100 of FIG. 1, receives an instruction to generate a personalised media content for the first player, the system may retrieve data associated with a third metric including the first player's relevant play history from a first game account and/or any other game accounts linked to their profile. After retrieving all relevant play history, the system may assign each potential in-game item rewards a User-Specific Item Desirability Score (USIDS). The in-game item(s) with the highest USIDS may be chosen to be added to the media content template and thus appear in the media content. For example, when there is data available regarding the first player's avatar appearance in the first game, their avatar may appear in the media content.

Figure 9:
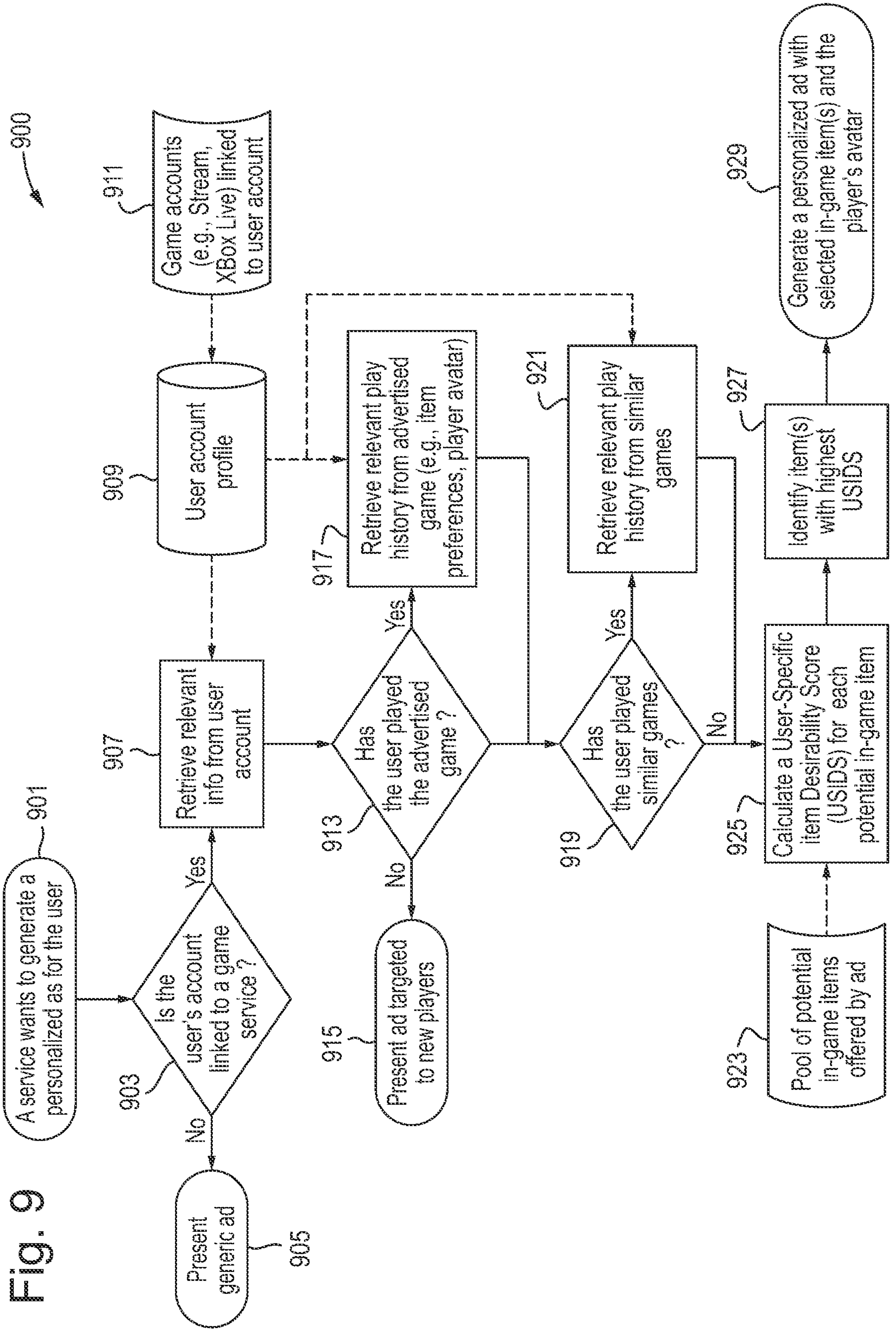
FIG. 9 illustrates a method according to one or more embodiments.

FIG. 9 illustrates a method 900 relating to another embodiment according to the present disclosure. The method 900 may be implemented, in whole or in part, by the system 100 shown in FIG. 1. One or more actions of the method 900 may be incorporated into or combined with one or more actions of any other process or embodiments described herein. The method 900 may be saved to a memory or storage (such as any one or more of those shown in FIG. 1) as one or more instructions or routines that may be executed by a corresponding device or system to implement the method 900.

The embodiment of FIG. 9 relates to an embodiment where a third metric is used to provide personalised media content to a first player. The third metric may include at least one of total game playtime, time since last played, character information and play history, proportion of playtime spent in single-player versus multiplayer, number of peer-to-peer transactions made and others. The third metric may be specific to one game or it may relate to all games played by the first player. The personalised media content may be, but not limited to, an advertisement content or a personalised ending of a game.

At step 901, it is desired to generate a personalised media content such as advertisement content including information of a first game for a first player by a media content providing service implemented in whole or in part, by the system 100 shown in FIG. 1. It should be appreciated that the advertisement content is exemplary and non-limiting and the media content may be any other form of media content. At step 903, it is determined whether a user account profile 909 associated with the first player is linked to a game service. If it is determined that the account 909 associated with the first player is not linked to a game service, then at step 905, a generic advertisement content is provided. If it is determined that the account 909 associated with the first player is linked to a game service, the method 900 proceeds to step 907. At step 907, relevant information such as a play history of the first player is retrieved from the user account profile 909. The user account profile 909 may be linked the first user's one or more game account 911 such as Steam, Xbox live.

At step 913, it is determined whether the first player has played the first game. If it is determined that the first player has not played the first game then at step 915, a version of the advertisement content targeted for new players is provided. This version of the advertisement content may be suitable for a new player because it provides one or more in-game item such as experience boosts, low-level items to start with or similar that tend be more useful for beginners. If it is determined that the first player has played the first game, then at step 917, data including information such as relevant play history from the first game (e.g., in-game item preferences, player avatar etc.) is retrieved. The data may be retrieved from or based on the user account profile 909.

At step 919, it is determined whether the first player has played other similar games to the first game. If it is determined that the first player has not played any other similar games to the first game then the method proceeds to step 925. If it is determined that the first player has played other similar games to the first game the method proceeds to step 921. At step 921 data including information such as relevant play history from any other similar games to the first game (e.g., in-game item preferences, player avatar etc.) is retrieved. The data may be retrieved from or based on the user account profile 909. The method then proceeds to step 925. All the retrieved data associated with the first player may be referred to as a third metric.

At step 925, a USIDS for each potential in-game item is calculated based on the third metric. The potential in-game items may be from a pool of potential in-game items offered by or available to combined with the advertisement media 923. At step 927, one or more items with highest USIDS is identified. At step 929, a personalised advertisement content including the identified one or more in-game items and/or the first player's avatar is generated.

In one embodiment, the in-game items are generated based on the first player's data, rather than chosen from a selection of pre-generated items.

In one embodiment, when the first player has not played the advertised game but has played previous games in a franchise, the advertisement content may display the first player's avatar from the previously played game or use play history from the previous game.

In one embodiment, when the first player has played previous games in a franchise of a 'choices matter' game, their choices in previous games influence the advertisement content generated for the first game. The 'choices matter' game may be a narrative-driven game that forces a player to make decisions that can dramatically influence a plot of the rest of the game, as well as future games in the series.

Figure 10:
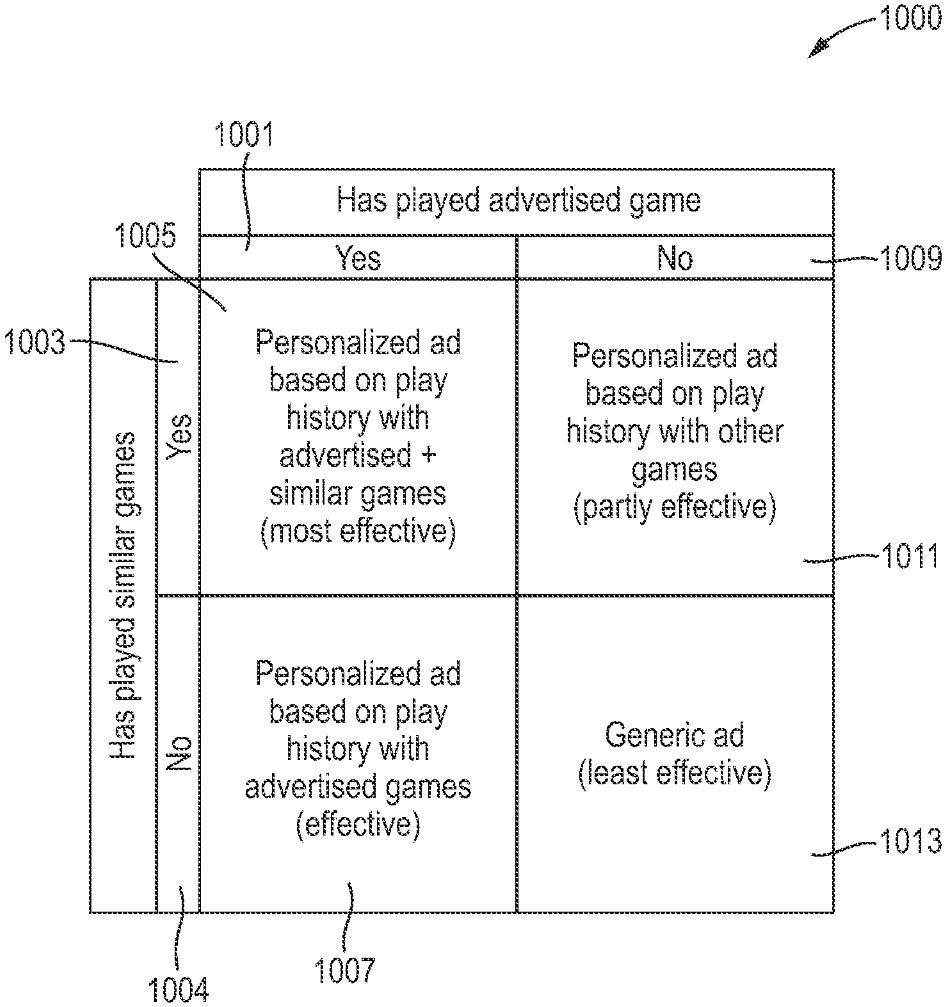
FIG. 10 illustrates a table relating to one or more embodiments.

FIG. 10 illustrates a table 1000 relating to the embodiment of FIG. 9 where a third metric is used to provide personalised media content to the first player.

When it is desired to provide a media content in relation to a first game to the first player, for example an advertisement content including information of the first game, in a first example, when the first player has already played the first game (as shown in box 1001) and the first player has also played similar other games to the first game (as shown in box 1003) then a personalised advertisement content based on the first player's play history of the first game and the play history of the similar other games may be provided (as shown in box 1005). In this manner the advertised content may be most effective in attracting the first user's attention to the advertisement content. In a second example when the first player has already played the advertised game (as shown in box 1001) but the first player has not played any other similar games to the first game (as shown in box 1004) then a personalised advertisement content based on the first player's play history of the first game may be provided (as shown in box 1007). In this manner the advertised content may be effective in attracting the first user's attention to the advertisement content, but may be less effective than the advertised content of the first example. In a third example, when the first player has not played the advertised game (as shown in box 1009) but the first player has played other similar games to the first game (as shown in box 1003) then a personalised advertisement content based on the first player's play history of the other similar games may be provided (as shown in box 1011). In this manner the advertised content may be partly effective in attracting the first user's attention to the advertisement content, which may be less effective than the advertised content of the first and second examples. In a fourth example, when the first player has not played the advertised game (as shown in box 1009) and the first player has not played any other similar games to the first game (as shown in box 1004) then a generic advertisement may be provided to the first user (as shown in box 1013). In this manner the advertised content may be least effective in attracting the first user's attention to the advertisement content which may be less effective than the advertised content of the first, second and third examples.

Figure 11:
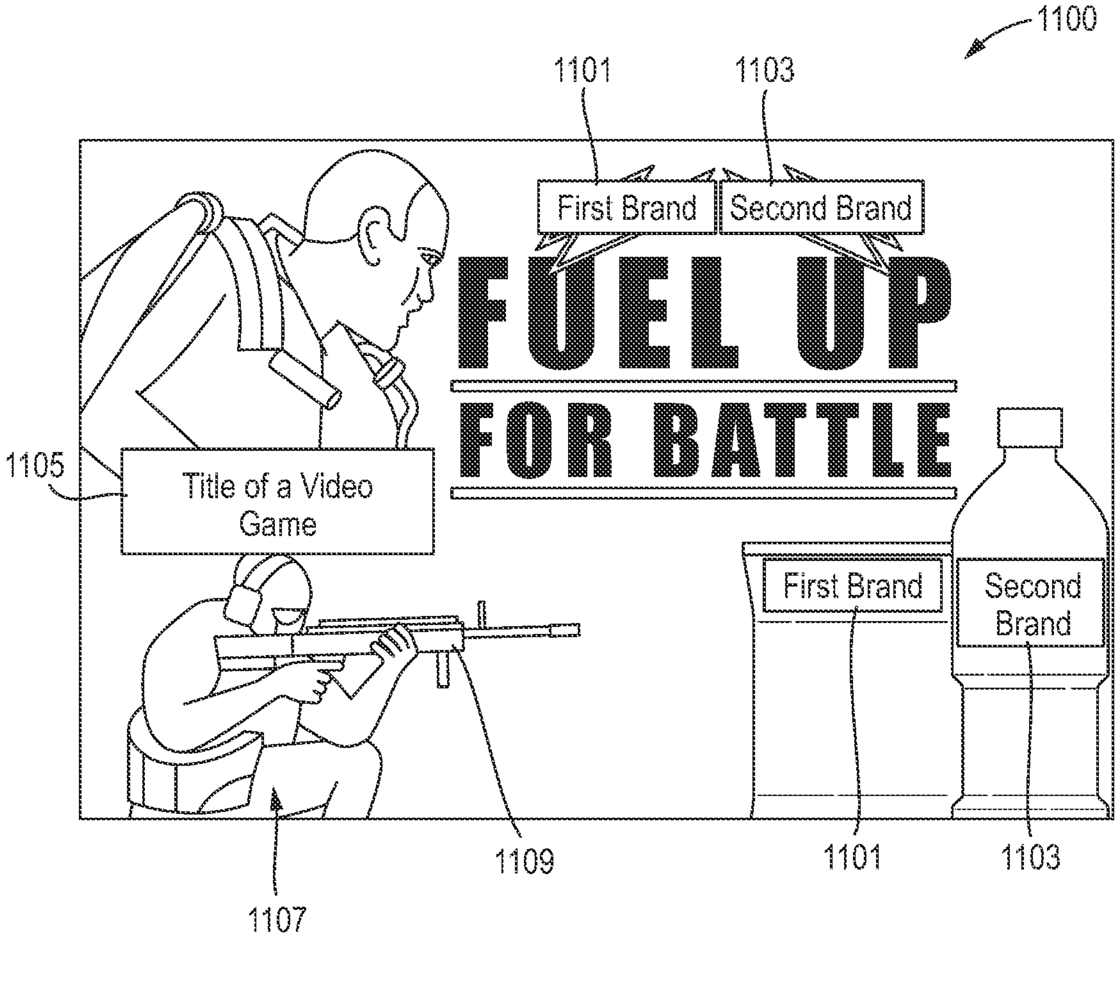
FIG. 11 illustrates a media content according to one or more embodiments.

FIG. 11 illustrates a media content 1100 that is provided to a first player according to the present disclosure. The media content 1100 may be the media content of the embodiment of FIGS. 9 and 10. It should be noted that the media content illustrated in FIG. 1100 is exemplary and non-limiting and in other embodiments the media content may have any other format, such as an audio format, a text format or other formats.

In this exemplary embodiment, the media content 1100 is in an image format including information of a first brand 1101, a second brand 1103 and a video game 1105. The information of the first brand 1101, the second brand 1103 and the video game 1105 may be a name and/or a logo associated with each respective brand or video game. The media content 1100 may be personalised for a first player based on a personalisation metric, such as the third metric of the embodiment of FIGS. 9 and 10. The personalised media content 1100 may include an image of a first player's character 1107 associated with the video game 1105 which may have been identified and included in the media content 1100 based on the first player's play history of the video game 1105 (i.e., information included in the third metric). The player's character 1107 may have an in-game item 1109 such as a weapon which may be a preferred type of in-game item for the first player. The in-game item 1109 may be a promotional in-game item. The in-game item 1109 may be identified based on the first player's play history of the video game 1105 (i.e., information included in the third metric). In this manner, the personalised media content 1100 may be most effective in attracting the first user's attention because it includes the in-game item 1109 that is preferred by the first player.

It should be appreciated that the embodiments described above (such as embodiments of FIGS. 1 to 11) are described in the context of a game engine or a media content providing service performing the methods and steps described therein as an example for ease of understandability, this is intended to be illustrative and not limiting. In other embodiments, any other network-based system, hardware module or software module including but not limited to a computer system, server, processor, electronic device, process node etc. can be used to perform the methods and steps of the present disclosed techniques.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving an instruction to generate an in-game item for a first player;

identifying a second player from among one or more players associated with the first player based on a first metric, wherein the first metric comprises a likelihood of engagement parameter that predicts a likelihood that the second player will engage in a peer-to-peer transaction with the first player;

generating a second metric comprising a user-specific item desirability score based on at least data associated with the second player, the user-specific desirability score predicting how useful an in-game item would be to the second player;

generating the in-game item based on the second metric; and providing the in-game item to the first player.

2. The method of claim 1, further comprising: determining that the user-specific item desirability score is above a threshold, and providing an output to the first player when the user-specific item desirability score associated with the second player is above the threshold.

3. The method of claim 2, wherein the output indicates the second player to the first player.

4. The method of claim 2, wherein the output comprises a user interface element facilitating exchange of in-game items between the first player and the second player.

5. The method of claim 1, wherein the first metric and/or the second metric comprise one or more parameters associated with game configuration.

6. The method of claim 1, wherein the identifying the second player based on the first metric comprises:
retrieving data associated with one or more players different from the first player,
generating a likelihood of engagement parameter for each one of the one or more players based on the data associated with the one or more players,
wherein the first metric comprises the likelihood of engagement of at least one of the one or more players.

7. The method of claim 6, further comprising: ranking the one or more players based on the generated likelihood of engagement associated with each one of the one or more players.

8. The method of claim 1, further comprising:
generating a third metric based on at least data associated with the first player,
identifying a second in-game item based on the third metric,
providing a media content including information associated with the second in-game item to the first player.

9. The method of claim 8, wherein the third metric is generated based on data including total playtime across one or all games spent with the first player, number of games previously played by the first player, proportion of time spent with single-player versus multiplayer games, number and/or type of game titles owned, number of peer-to-peer transactions made across one or all games.

10. The method of claim 1, wherein the in-game item is generated based at least in part on data associated with the second player rather than chosen from a selection of pre-generated items.

11. The method of claim 1, further comprising:
analyzing in-game communications associated with the second player; and
updating the user-specific item desirability score based at least in part on the analysis of the in-game communications, wherein when the second player discusses a specific in-game item in text or voice chat, the user-specific desirability score for the specific in-game item is increased.

12. A system comprising control circuitry configured to:
receive an instruction to generate an in-game item for a first player;
identify a second player from among one or more players associated with the first player based on a first metric, wherein the first metric comprises a likelihood of engagement parameter that predicts a likelihood that the second player will engage in a peer-to-peer transition with the first player;
generate a second metric comprising a user-specific item desirability score based on at least data associated with the second player, the user-specific item desirability score predicting how useful an in-game item would be to the second player;
generate the in-game item based on the second metric; and
provide the in-game item to the first player.

13. The system of claim 12, wherein the control circuitry is configured to determine that the user-specific item desirability score is above a threshold, and provide an output to the first player when the user-specific item desirability score associated with the second player is above the threshold.

14. The system of claim 13, wherein the output indicates the second player to the first player.

15. The system of claim 13, wherein the output comprises a user interface element facilitating exchange of in-game items between the first player and the second player.

16. The system of claim 12, wherein the first metric and/or the second metric comprise one or more parameters associated with game configuration.

17. The system of claim 12, wherein the control circuitry is configured to:
retrieve data associated with one or more players different from the first player,
generate a likelihood of engagement parameter for each one of the one or more players based on the data associated with the one or more players,
wherein the first metric comprises the likelihood of engagement of at least one of the one or more players.

18. The system of claim 17, wherein the control circuitry is configured to rank the one or more players based on the generated likelihood of engagement associated with each one of the one or more players.

19. The system of claim 12, further configured to:
generate a third metric based on at least data associated with the first player,
identify a second in-game item based on the third metric,
provide a media content including information associated with the second in-game item to the first player.

20. The system of claim 19, wherein the third metric is generated based on data including total playtime across one or all games spent with the first player, number of games previously played by the first player, proportion of time spent with single-player versus multiplayer games, number and/or type of game titles owned, number of peer-to-peer transactions made across one or all games.

* * * * *